US006435655B1

(12) United States Patent
Yoshihira et al.

(10) Patent No.: US 6,435,655 B1
(45) Date of Patent: Aug. 20, 2002

(54) COLOR INK JET RECORDING METHOD/ APPARATUS

(75) Inventors: Aya Yoshihira, Yokohama; Hiromichi Noguchi, Hachioji; Nobuhito Yamaguchi, Inagi; Toshihiko Bekki, Yokohama; Shinichi Sato, Kawasaki; Hiroshi Tomioka; Takumi Kaneko, both of Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/734,198

(22) Filed: Dec. 12, 2000

(30) Foreign Application Priority Data

Dec. 14, 1999 (JP) .......................................... 11-354366

(51) Int. Cl.$^7$ ............................ B41J 2/21; G01D 11/00

(52) U.S. Cl. ......................................... 347/43; 347/100

(58) Field of Search ............................ 347/15, 43, 100; 106/31.59, 20, 31.13

(56) References Cited

U.S. PATENT DOCUMENTS

| | | | | |
|---|---|---|---|---|
| 4,313,124 A | | 1/1982 | Hara | 347/57 |
| 4,345,262 A | | 8/1982 | Shirato et al. | 347/10 |
| 4,459,600 A | | 7/1984 | Sato et al. | 347/47 |
| 4,463,359 A | | 7/1984 | Ayata et al. | 347/56 |
| 4,558,333 A | | 12/1985 | Sugitani et al. | 347/65 |
| 4,723,129 A | | 2/1988 | Endo et al. | 347/66 |
| 4,740,796 A | | 4/1988 | Endo et al. | 347/56 |
| 5,221,334 A | | 6/1993 | Ma et al. | 106/204 |
| 6,089,697 A | | 7/2000 | Tajika et al. | 347/43 |
| 6,154,228 A | * | 11/2000 | Okuda et al. | 347/15 |

FOREIGN PATENT DOCUMENTS

| | | |
|---|---|---|
| JP | 59-123670 | 7/1984 |
| JP | 59-138461 | 8/1984 |
| JP | 5-179183 | 7/1993 |
| JP | 5-247392 | 9/1993 |

* cited by examiner

*Primary Examiner*—Thinh Nguyen
(74) *Attorney, Agent, or Firm*—Fitzpatrick, Cella, Harper & Scinto

(57) ABSTRACT

A color ink jet recording method/apparatus is capable of reducing blurring of ink dots without reducing dot saturation, generating no difference in tones of secondary colors, and inviting no reduction of throughput, hence materializing an excellent performance of recording in high quality at high speed. A color image is formed by causing ink dots of plural colors to land in such a manner that each of the ink dots is essentially not superposed. The ink dots have the optical density of 1 or more and 1.5 or less. Thereby, overlapping between adjacent ink dots is lessened, and thus a high-quality color image having no difference in tones of secondary colors and a high saturation can be attained.

14 Claims, 9 Drawing Sheets

COLOR INK JET RECORDING METHOD/ APPARATUS

BACKGROUND OF THE INVENTION

1. Field of the Invention

The present invention relates to color ink jet recording method/apparatus for forming color images on a recording medium by use of ink of plural colors.

2. Related Background Art

There has been known conventionally a color ink jet recording method for forming color images by discharging ink of plural colors from discharge ports for the adhesion thereof to a recording medium. A color ink jet recording method of the kind forms in general color images in mixed colors using four colors of ink, yellow (Y), magenta (M), cyan (C), and black (K). Then, for the formation of secondary color, such as R (red), G (green), and B (blue), the aforesaid three colors, yellow (Y), magenta (M), and cyan (C), are appropriately combined and mixed.

This color ink jet recording method is an excellent recording method which makes it possible to implement recording in high image quality at high speed with less noise, and at lower cost. In recent years, therefore, the color ink jet recording method has been widely utilized for a printer, a copying machine, a facsimile machine, and much other office equipment. Further, this method is used for a large-size plotter, and even utilized for printing color proofs, posters, and others in the printing industry.

Now that the ink jet recording technologies are applied not only to office equipment, but also to other equipment such as used in the industrial fields, it is desired to provide color images in much higher quality with higher durability. For a method for forming images in higher quality, various proposals have been made with various points of view. For example, there is a method of increasing the number of gradations that can be represented by use of darker and lighter ink, a method of reducing the granular senses of dots by attempting to make small liquid droplets finer still, or the like.

Conventionally, however, only the execution of the aforesaid method is not good enough to record images in higher quality. In order to attain recording in higher quality with a different angle of view, there are encountered problems yet to be solved as given below.

Firstly, there is a problem related to the saturation of images. As described above, when recording should be made in secondary colors by the ink jet method, ink containing colorant of different colors should be superposed to mix colors for obtaining a desired resolution in some cases. When ink of different colors should be mixed as described above, the ink colorant on the lower layer is subjected to being influenced by the ink colorant on the upper layer with resultant light scattering, thus making it difficult to obtain stable color reproduction. Also, the saturation of ink dots is reduced inevitably due to the two to three ink dots which are superposed on the same landing point. With such reduced saturation, the range of color reproduction is made narrower eventually. In contrast, if saturation is made higher, the range of color reproduction is widened to make it possible to obtain images in higher quality. Therefore, it is desired to provide a recording method in which saturation may be made higher. Also, in order to improve an image representation, there is a method of enhancing the density of ink, that is, a method of making the density of the colorant in ink higher. But, if droplets of the ink whose colorant is made denser are superposed on the same landing point one after another, saturation becomes lower still and the range of color reproduction is made narrower accordingly. As for a printed object for outdoor use, such as a poster, pigments are generally used as colorants in order to strengthen the light resistance. As a result, if pigments are used in the ink jet method, the reduction of saturation as described above becomes more conspicuous.

Secondly, there is a problem related to the change of color tones (or color flavors) depending on the order in which ink of different colors is superposed. Here, bidirectional printing is effective for high speed recording, but the bidirectional printing brings about the different order of ink superposition eventually. Then, in some cases, the color tones are caused to change due to the different order of ink superposition. The lesser the change of color tones, the higher becomes the quality of image recorded. Thus, for recording images in high quality at high speed, it is desired to provide a recording method which Is capable of reproducing colors irrespective of the order in which ink of different colors should be superposed.

Thirdly, at the end, there is a problem related to blurring due to ink superposition. When recording in secondary colors, ink of different colors is superposed on the same landing point. As a result, the amount of ink to be shot onto a recording medium becomes greater than that of ink to be shot for monochromatic recording. Thus, depending on the ink absorption capability of a recording medium to be used, ink is not absorbed good enough and may blur eventually in some cases. Also, in order to prevent the blurring, it is possible to make an arrangement so as to shoot the second ink droplet onto a recording medium at a sufficient interval after the shooting of the first one. However, this requires a longer period for recording. Ink blurring should preferably be reduced without making the recording period longer.

Under such circumstances, the inventors hereof have found it necessary to solve the problems related to the reduction of saturation, the difference in color tones, the blurring of ink, and the reduction of throughput simultaneously when recording in secondary colors, and have designed the present invention after various attempts with a view to solving them at the same time.

SUMMARY OF THE INVENTION

Here, therefore, with a view to solving the first to third problems discussed above, the present invention is designed. It is an object of the invention to provide color ink jet recording method/apparatus capable of reducing blurring of ink dots without reducing dot saturation, generating no difference in tones of secondary colors, and inviting no reduction of throughput.

In order to achieve these objects, there is provided a color ink jet recording method of the invention, which forms a color image on a recording medium by discharging ink of plural colors from an ink jet head in accordance with image data to enable monochrome dot(s) to apply to one pixel, featured by comprising the step of performing a recording operation in accordance with all the data of the image data by forming on the recording medium ink dots of plural colors having the optical density of 1 or more and 1.5 or less with an average dot diameter $\phi(\mu m)$ after fixation of ink applied thereon being $(2.54\times10^4/R)\leqq\phi\leqq(\sqrt{2}\times2.54\times10^4/R)$ (where R is resolution in units of dpi (dot/inch)).

Also, there is provided the color ink jet recording apparatus of the invention, which forms a color image on the recording medium in accordance with image data by discharging ink to a recording medium to enable monochrome dot(s) to apply to one pixel scanning an ink jet head having a plurality of discharge ports for discharging ink of plural colors, relatively to the recording medium, featured by comprising driving means for causing the ink jet heads to record in accordance with the image data so as to enable ink dots of plural colors having the optical density of 1 or more and 1.5 or less to be within a range of an average dot diameter $\phi(\mu m)$ after fixation of ink applied thereon being $(2.54\times10^4/R)\leqq\phi\leqq(\sqrt{2}\times2.54\times10^4/R)$ (where R is resolution, unit being dpi (dot/inch)).

Here, also, is provided by the present invention a method for processing image data to form a color image on a recording medium by discharging ink of plural colors from an ink jet head in accordance with image data, featured by comprising the steps of providing image data on an image to be formed; and processing the image data for recording in accordance with all the data of the image data by forming on the recording medium, by enabling monochrome dot(s) to apply to one pixel, ink dots of plural colors having the optical density of 1 or more and 1.5 or less with an average dot diameter $\phi(\mu m)$ after fixation of ink applied thereon being $(2.54\times10^4/R)\leqq\phi\leqq(\sqrt{2}\times2.54\times10^4/R)$ (where R is resolution, unit being dpi (dot/inch)).

Here, also, is provided by the present invention an apparatus for processing image data to form a color image on a recording medium by discharging ink of plural colors from an ink jet head in accordance with image data, featured by comprising means for processing image data to process the image data for recording in accordance with all the data of the image data by forming on the recording medium, by enabling monochrome dot(s) to apply to one pixel, ink dots of plural colors having the optical density of 1 or more and 1.5 or less with an average dot diameter $\phi(\mu m)$ after fixation of ink applied thereon being $(2.54\times10^4/R)\leqq\phi\leqq(\sqrt{2}\times2.54\times10^4/R)$ (where R is resolution, unit being dpi (dot/inch)).

In addition, it is noted that one inch referred to in the specification hereof means 2.54 cm.

Also, in the specification hereof, the phrase "each of ink dots is not essentially superposed" is assumed to include a degree of dot superposition to the extent that given the radius of an ink dot as r, the distance 1 between centers of adjacent dots satisfies the relation of $\sqrt{2}r\leqq 1\leqq 2r$. In other words, the degree of dot superposition shown in FIG. 6 is minimum, and the one shown in FIG. 7 is maximum.

DETAILED DESCRIPTION OF THE PREFERRED EMBODIMENTS

Hereinafter, with reference to the accompanying drawings, the detailed description will be made of the embodiments in accordance with the present invention.

Figure 1:
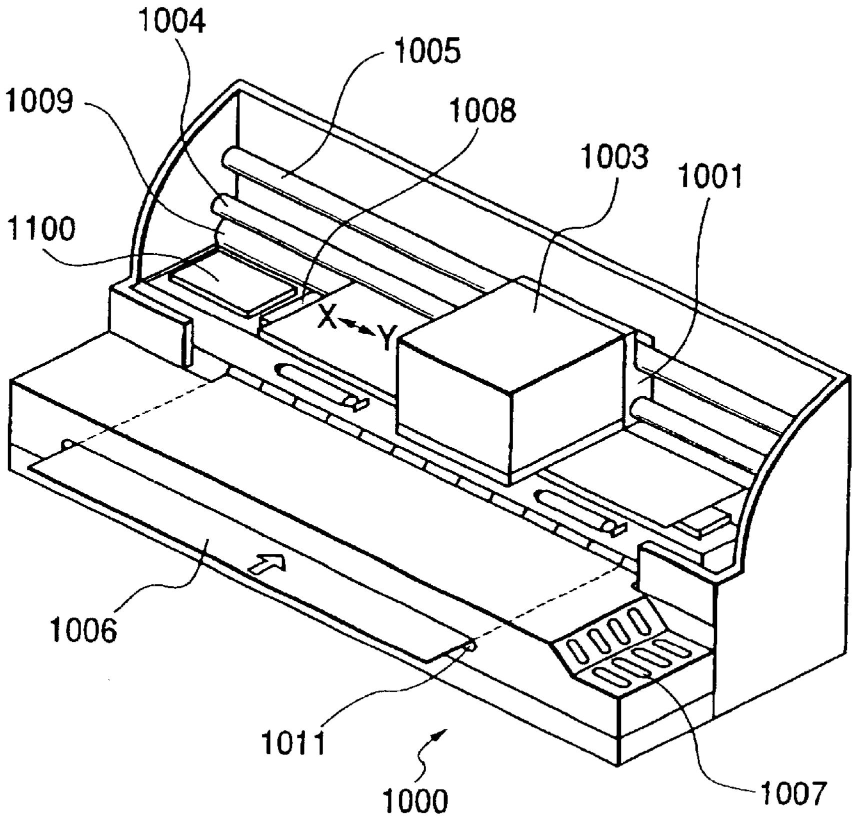
FIG. 1 is a perspective view which shows the recording apparatus to which the present invention is applicable.

FIG. 1 is a perspective view which shows the outline of an ink jet recording apparatus 1000 in accordance with one embodiment of the present invention. For the ink jet recording apparatus, a carriage 1001 engages slidably with two guide shafts 1004 and 1005, which extend in parallel to each other. In this manner, the carriage 1001 can travel along the guide shafts 1004 and 1005 by means of a driving motor and a driving power transmission mechanism, such as a belt to transmit driving power (neither of them shown). On the carriage 1001 is mounted an ink jet unit 1003 comprising an ink jet head and an ink tank serving as an ink container to retain ink to be used for the head.

The ink jet unit 1003 is structured with the heads each discharging ink, and the tanks each serving as a container to retain ink to be supplied to each of the heads. In other words, four heads each discharging black (K), cyan (C), magenta (M), and yellow (Y) ink, respectively, and tanks each arranged corresponding to each of the heads are mounted on the carriage 1001 as the ink Jet unit 1003. In this respect, it may be possible to supply at least cyan (C), magenta (M), and yellow (Y) ink to the respective heads, while using a process of mixing YMC appropriately to produce black (K) color. Each of the heads and each of the tanks are detachable from each other, and the arrangement is made so that when ink in each of the tanks is no longer available, only such tank can be replaced per ink as required. Also, it is arranged to be able to exchange only the head as required as a matter of course. Here, it is of course possible to arrange the structure so that the heads and tanks are formed integrally as one body, not necessarily limited to the above example of the structure whereby to detachably install the heads and tanks.

A sheet 1006 which serves as a recording medium is inserted from an inlet port 1011 arranged for the front part of the apparatus, and the carrying direction thereof is reversed lastly, thus being carried by means of a carrying roller 1009 to the lower part of the traveling area of the carriage 1001. In this way, recording is made on the recording area of the sheet 1006 supported by a platen 1008 along with the traveling of the heads mounted on the carriage 1001.

As described above, with the repetition of widthwise recording corresponding to the width of head discharge port arrangement and the conveyance of the sheet 1006, which is performed alternately, recording is made on the entire recording area of the sheet 1006. Then, the sheet 1006 is led out to the front side of the apparatus. Here, the aforesaid recording is possible by discharging ink from the heads with the traveling of the carriage both in the direction x and direction Y. In other words, bidirectional printing is made executable.

On the left end of the area in which the carriage 1001 can travel, a recovery system unit 1010 is installed to be able to face each of the heads on the carriage 1001 and the lower part thereof, with which it is made possible to operate capping the discharge ports of each head, as well as to operate sucking ink or the like from the discharge ports of each head when recording is at rest. Also, the specific position of this left edge portion is defined as the head home position.

On the other hand, the right edge portion of the apparatus is provided with an operation unit 1007 having switches and display (or indication) devices arranged therefor. Here, the switches are used to turn on/off the power supply source, and also, to set various kinds of printing modes or the like. The display devices function to display various conditions of the apparatus.

Figure 2:
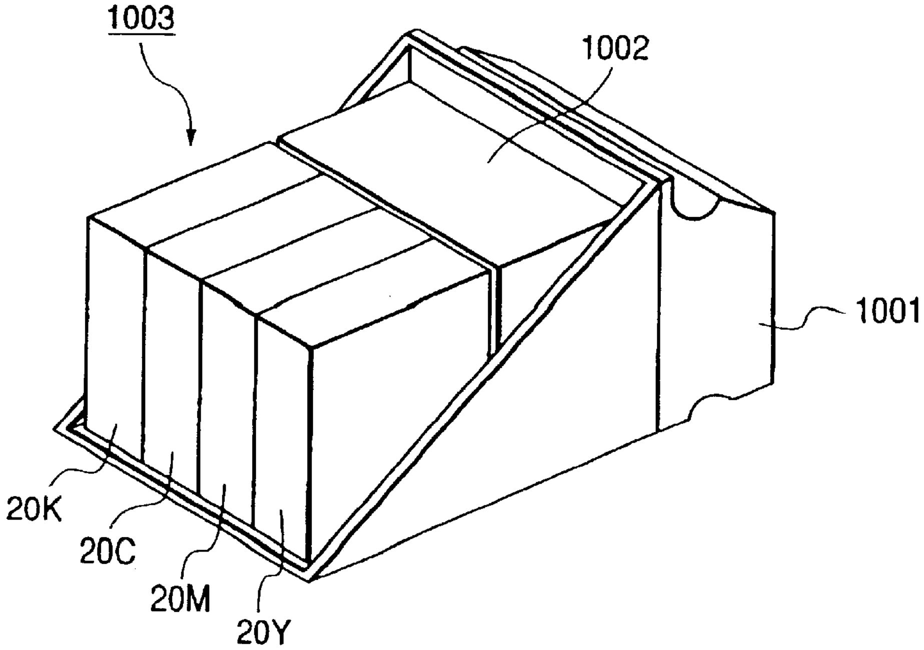
FIG. 2 is a perspective view which schematically shows an ink jet unit represented in FIG. 1.

FIG. 2 is a perspective view which schematically shows the ink jet unit 1003 illustrated in FIG. 1. This unit is designed to make each of the color ink tanks, black, cyan, magenta, and yellow, exchangeable independently.

In other words, there are mounted on the carriage 1001, a head case 1002 for detachably installing each of the heads individually, as well as a tank 20K for black color use, a tank 20C for cyan color use, a tank 20M for magenta color use, and a tank 20Y for yellow color use. In the head case 1002, the heads 30K, 30C, 30M, and 30Y (not shown) which discharge K, C, M, and Y ink, respectively, are installed. Each of the heads is provided with 256 discharge ports, respectively, for example, and from each of the discharge ports, ink is discharged in an amount of approximately 2 pl (picoliter). The tanks are connected with the heads through the respective connectors to supply ink.

In this respect, it may be possible to structure the C, M, and Y tanks integrally as one body depending on the amount of ink to be used, for example.

Figure 3:
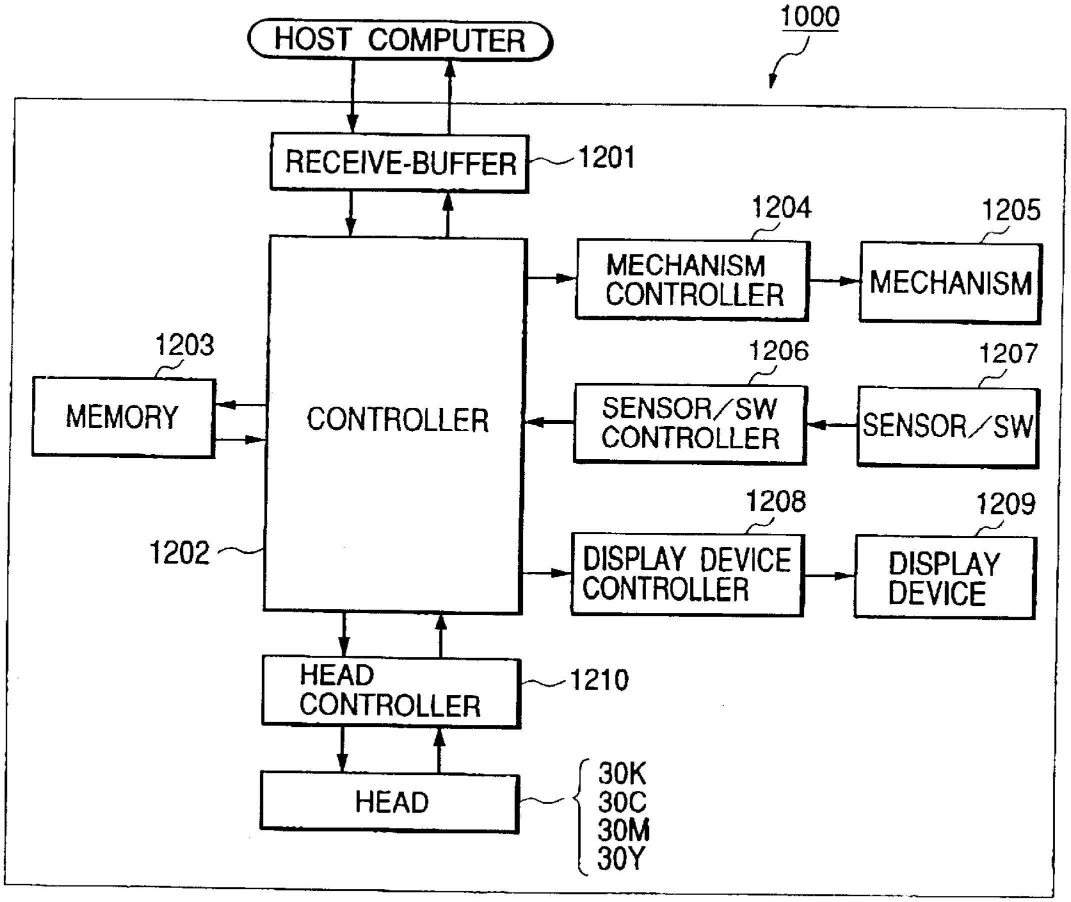
FIG. 3 is a block diagram which shows the structure of a control system of the recording apparatus to which the present invention is applicable.

FIG. 3 is a block diagram which shows the structure whereby to control the ink jet recording apparatus 1000 in accordance with the present embodiment of the present invention. From a host computer, data which should be recorded, such as characters and images (hereinafter referred to as image data), are inputted into a receive-buffer 1201 of an output device 1000. Also, from the recording apparatus, such data as to confirm whether or not data have been transmitted correctly, as well as such data as to notify the operational condition of the output device, are transferred to the host computer. The data inputted into the receive-buffer 1201 are transferred to a memory 1203 (RAM) under the control of a controller 1202 having a CPU, and stored provisionally. A mechanism controller 1204 drives a mechanical portion 1205, such as a carriage motor and a line feed motor which serves as the driving power source of the carriage 1001 and the carrying roller 1009, respectively, in accordance with instructions from the controller 1202. A sensor/SW controller 1206 transmits signals from a sensor/SW unit 1207 formed by various sensors and SWs (switches) to the controller 1202. A display device controller 1208 controls the displaying contents of a display device unit 1209, which is formed by LEDs on display panels, liquid crystal display devices, and the like, in accordance with instructions from the controller 1202. A head controller 1210 controls each of the heads 30K, 30C, 30M, and 30Y individually in accordance with instructions from the controller 1202. Also, the temperature information and others which indicate the current condition of each head are read and transferred to the controller 1202.

Figure 4:
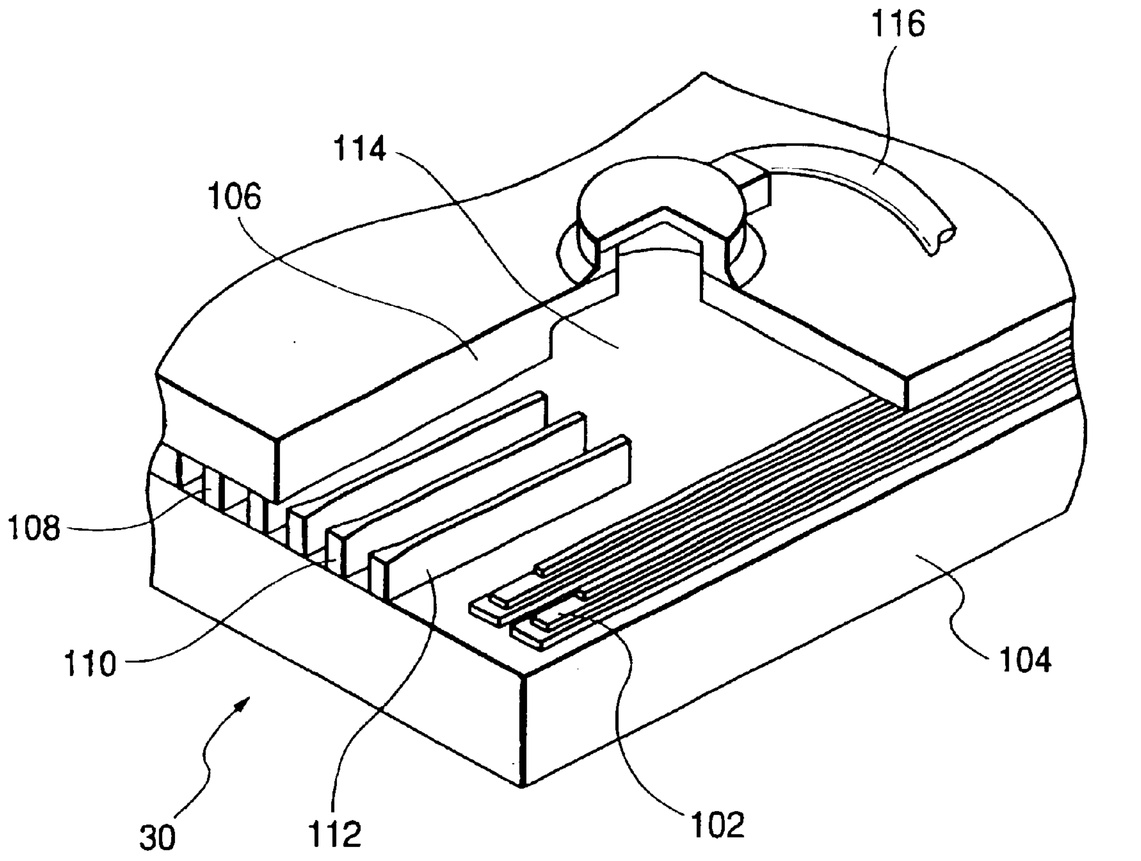
FIG. 4 is a view which shows the structure of an ink jet head used for the recording apparatus in accordance with the present invention.

FIG. 4 is a view which shows the structure of the ink jet heads 30 (30K, 30C, 30M, and 30Y) used by the ink jet recording apparatus 1000 represented in FIG. 1.

In the above description, four heads are arranged, for use of K, C, M, and Y ink, respectively, but in FIG. 4, the structure of one of the four heads is shown, because each of them has the same structure.

In FIG. 4, the ink jet head 30 comprises a heater board 104, which is a base plate having a plurality of heaters 102 arranged thereon to heat ink, and a ceiling plate 106 which covers the heater board 104. For the ceiling plate 106, a plurality of discharge ports 108 are formed, and behind the discharge ports 108, are formed tunnel type liquid paths 110 to communicate with the discharge ports 108, respectively. Each of the liquid paths 110 is completely separated from the adjacent liquid paths by means of separation walls 112. Each of the liquid paths 110 is commonly connected with one ink liquid chamber 114 on the rear side thereof. Then, ink is supplied to the ink liquid chamber 114 through an ink supply port 116, and then, supplied from the ink liquid chamber 114 to each of the liquid paths 110.

The heater board 104 and the ceiling plate 106 are positioned so that each of the heaters 102 is positioned to face each of the liquid paths 110. Then, assembling is made as shown in FIG. 4. In FIG. 4, only two heaters 102 are shown, and the heaters 102 are arranged for the liquid paths 110 one to one. Then, in the assembled state as shown in FIG. 4, ink on each of the heaters 102 generates film boiling to form bubbles when specific driving pulses are given to the heaters 102. With the pressure thus exerted by bubbling, ink is pressed and discharged from each of the ink discharge ports 108. Then, it becomes possible to control the volume of ink to a certain extent at this time by controlling the driving pulses to be applied to the heaters 102, respectively.

Figure 5:
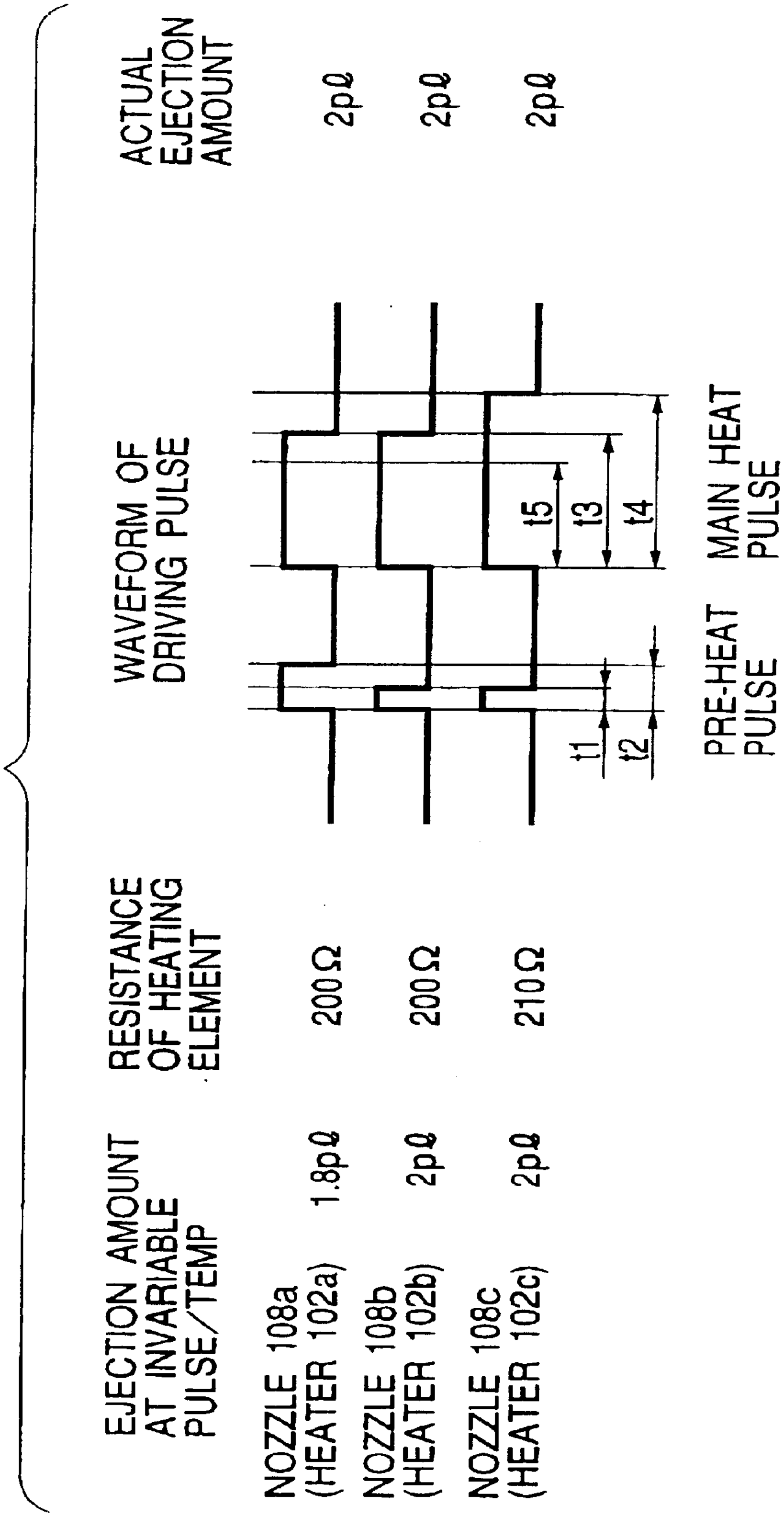
FIG. 5 is a view which illustrates a method for controlling the discharging amount of ink by changing the electric power to be applied to heaters.

FIG. 5 is a view which illustrates one method for controlling the discharging amount of ink by changing the driving pulses to be applied to heaters. Here, in order to adjust the discharging amount of ink, two kinds of pulses are applied to each heater 102 at invariable voltage. As shown in FIG. 5, the two kinds of pulses are pre-heat pulse and main heat pulse (hereinafter, simply referred to as heat pulse). The pre-heat pulse is used for warming ink prior to the actual ink discharge, which is set at a value smaller than the minimum pulse width t5 required for discharging ink. Therefore, the pre-heat pulse allows no ink to be discharged. Now, by adjusting the length of the pre-heat pulse, it is possible to make the discharge amount of ink different.

On the other hand, the heat pulse is the one used for discharging ink actually, which is set at a length longer than the minimum width t5 required for discharging ink. The intensity of energy generated by each heater 602 is proportional to the width of heat pulse (application period). Therefore, it is possible to adjust the variation in characteristics of heaters 602 by adjusting the width of heat pulse.

In this respect, with the adjustment of each interval between the pre-heat pulse and the heat pulse, the condition of heat diffusion caused by pre-heat pulses can be controlled to make it possible to adjust the discharging amount of ink.

As clear from the above description, the discharging amount of ink can be controlled not only by the adjustment of the application period of the pre-heat pulse and the heat pulse, and also, it can be controlled by the adjustment of the application interval between the pre-heat pulse and the heat pulse. For the present invention, such adjustments of ink discharge amount may be made as required.

Figure 6:
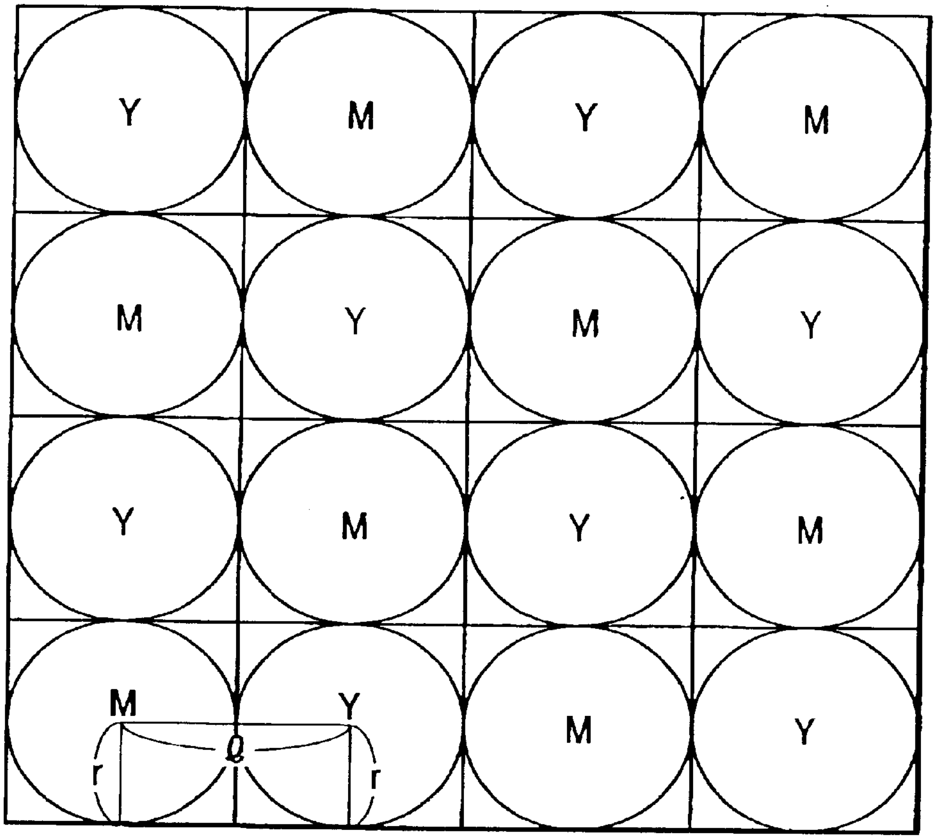
FIG. 6 is a view which shows dots having landed in such a manner as to allow adjacent dots to be in contact.

With the ink jet recording apparatus described above, it is possible to materialize the present invention. Here, in conjunction with FIG. 6 and FIG. 7, the characteristics of the invention will be described. The invention is characterized in that ink of different colors is essentially superposed even when recording is made in secondary colors. In other words, as shown in FIG. 6, a secondary color is formed by aggregating monochrome dots. FIG. 6 shows the case where recording is made in red (R) color in particular, and Y dots and M dots are shot so as to be in contact with each other within a dot matrix of 4×4. Here, Y dots and M dots are mixed by and individually present within a specific region (dot matrix of 4×4), so that the region is made visible as a red color, even if the Y dots and M dots are not superposed on the same landing point. Here, also, given the dot radius as r, the distance 1 between dot centers is 1=2r. Now, although FIG. 6 shows the case where recording is made in red (R) color, it is of course possible to record in green (G) and blue (B) colors in the same manner using Y dots and C dots to record in green (G) color, and M dots and C dots to record in blue (B) color, respectively.

Figure 7:
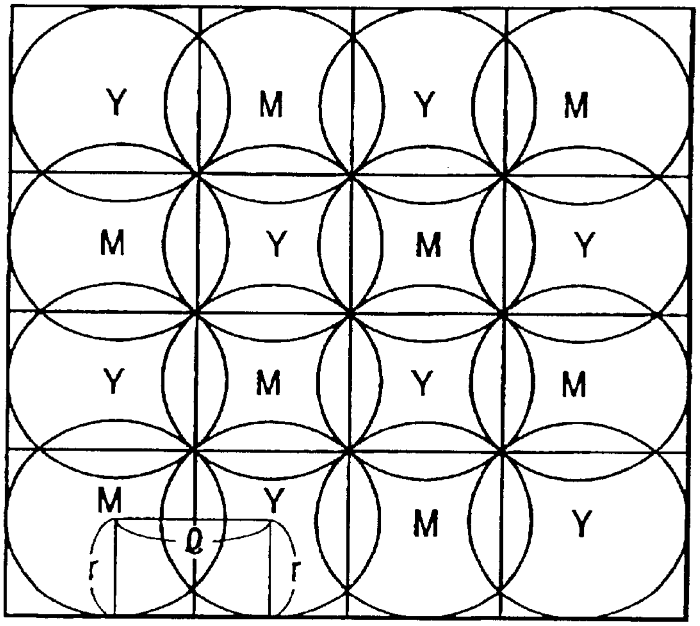
FIG. 7 is a view which shows adjacent dots slightly being superposed.

Also, the present invention not necessarily limited to such arrangement as shown in FIG. 6 where dots are shot so that adjacent dots themselves are in contact with each other, but as shown in FIG. 7, a secondary color may be formed by superposing adjacent dots themselves slightly. In such a case where superposition is only slight as this, the resultant reduction of saturation, presence of blurring, or the like may be negligible. Here, FIG. 7 shows the case where recording is made in red (R) color, and the adjacent Y dots and M dots are shot so as to superpose them slightly. Then, given the dot radius r, the distance l between dot centers is $l=\sqrt{2}r$.

As described above, it is preferable to set the superposing degree of adjacent dots so that the relation between the dot radius r and the distance l between centers of adjacent dots can satisfy a range of $\sqrt{2}r \leqq l \leqq 2r$. The present invention can be materialized by satisfying this relation. On the other hand, if the relation between the dot radius r and the distance l between centers of adjacent dots should be out of the above-mentioned range, drawbacks are caused to occur as given below. In other words, if the relation is $l>2r$, the gap between adjacent dots becomes great, because the dots are not in contact with each other. Then, even if density of each ink dot is made higher, it becomes difficult to obtain images in sufficient density. Meanwhile, if the relation is $<\sqrt{2}r$, the dot superposition becomes too great, and the reduction of saturation is invited inevitably. It is desirable to set the degree of dot superposition at $\sqrt{2}r \leqq l$ in order to record images with good saturation. Here, it is not desirable to make the superposing degree too great, because this may also present the problem of blurring. Therefore, the superposing degree should preferably be set within a range of $\sqrt{2}r \leqq l \leqq 2r$.

Also, this degree of dot superposition can be expressed in the relation between dot diameter ϕ and resolution R. Here, the dot diameter ϕ is the mean value after ink has been fixed, that is, when blurring of ink adhered to a recording medium is completed so as not to allow the dot to become larger any longer. In other words, this relation can be expressed as $(2.54\times10^4/R) \leqq \phi(\mu m) \leqq (2.54\times\sqrt{2}\times10^4/R)$. (Here, the unit of R is dpi (dot/inch).) Now, assuming that $\phi<(2.54\times10^4/R)$, it is impossible to obtain sufficient density for a printed object even if the dot density is made high. Also, if the relation is $(2.54\times\sqrt{2}\times10^4/R)<\phi$, the dot superposition becomes too great, hence making it impossible to sufficiently demonstrate the enhancement of saturation, which is an objective of the present invention. The aforesaid limit of the numerical values has critical significance, which has been confirmed by experiments.

Here, in other words, the characteristic of the present invention is that if, for example, one image is represented in terms of M×N dot matrix, only one ink droplet should be shot into each of the cells that form the dot matrix under any circumstance. Also, for the present invention, the degree of dot superposition is adjusted as shown in FIG. 6 or FIG. 7. This adjustment is made by the dot diameter determined in consideration of the ink discharging condition and the blurring ratio of a recording medium. Then, in order to shoot dots as shown in FIG. 6 or FIG. 7, the discharge amount and the accuracy of landing are controlled by the controller 1202 that controls the recording apparatus as a whole, and also, a recording medium having an appropriate blurring ratio is used. Here, such control is executed by use of the controller 1202, and besides, it may be possible to process image data on the host computer side or to process them both on the host computer side and on the recording apparatus side for driving ink jet heads appropriately. Also, as shown in FIG. 6 or FIG. 7, the control that sets the dot diameter ϕ within a range of $(2.54\times10^4/R) \leqq \phi(\mu m) \leqq (2.54\times\sqrt{2}\times10^4/R)$ is made for all the data of the input image. In other words, the aforesaid control is made for data of all the density levels. In this way, for any portion of one page, the dot diameter ϕ can be kept within a range of $(2.54\times10^4/R) \leqq \phi(\mu m) \leqq (2.54\times\sqrt{2}\times10^4/R)$. In this respect, the dot diameter is measured by obtaining dots from a metal microscope through a CCD camera, binary coding intensity data of dots by a known image processing device for use of dot diameter measurement, and then converting dots into complete rounds based on a dot area thus measured, the diameter of which is measured as a diameter of the target dot.

Also, for the present invention, the optical density of an ink dot, that is, the optically reflective density (OD value), should preferably be set at 1 or more and 1.5 or less, wherein the OD is the abbreviation of optical density, and the OD value is such value of each individual dot. This range is because the present invention implements to minimize the superposing degree of adjacent dots as compared with the conventional art. If the dot density is made smaller than 1, the density becomes insufficient for a recording object as a whole. If the dot density is made greater than 1.5, it becomes difficult to represent a half tone image. Therefore, it is necessary to make the optical density (OD value) of ink dot 1 or more and 1.5 or less. Here, for the present invention, pigments or dyestuffs are used as colorants of ink, and the optical density of ink dots is made 1 or more and 1.5 or less by adjusting the colorant densities in ink. More specifically, the pigment or dyestuff content as colorant is kept within a range of 1 to 10 weight (wt) % in the weight ratio to the entire amount of ink liquid or, more preferably, within a range of 2 to 8 wt %.

As described above, it is possible to obtain color images having sufficient density without the reduction of saturation or any problem of blurring if recording is made at the dot OD value which is set within a range of $1 \leqq$ OD value $\leqq 1.5$ in the condition that the degree of dot superposition is set as shown in FIG. 6 or FIG. 7. Also, there is no possibility that different colorants are superposed on a recording medium. Consequently, each colorant generates stable light diffusion at all times to make it possible to reproduce colors stable, as well as to enhance saturation. Here, recording is possible in this condition in the entire range of image data from the lowest level to the highest level. In other words, recording is possible in the above condition for the entire images within one page irrespective of the portions having lower density or higher density.

Also, in manufacturing pigment ink, dispersing element of pigment is produced in advance. As regards the method of manufacture therefor, it is possible to use the methods disclosed in the specifications of Japanese Patent Application Laid-Open Nos. 5-179183 and 5-247392, among some others.

Also, the ink composition does not matter whether it is water soluble or oily, nor even if it has any solvent composition, on condition that ink of such composition can be discharged from nozzles stably. Here, however, the physical property of ink liquid should preferably be: the range of viscosity η (unit: cps) is within a range of $1 \leqq \eta \leqq 10$, and the surface tension γ (unit: dyne/cm) is within a range of $35 \leqq \gamma \leqq 70$. In this respect, the reason that the viscosity should be within the above range is that if viscosity is low, blurring is easier to occur, while if it is high, fixing and discharging capabilities may become unfavorable. Also, the reason that the surface tension should be within the above range is that if the surface tension is low, blurring is easier to occur, while if it is high, fixing capability becomes unfavorable.

Also, ink liquid may be able to contain resin as binder. The weight ratio between colorant and resin should preferably be within a range of colorant:resin=100:1 to 100:300.

Also, the resolution of images may be determined necessarily by the discharge amount of ink and the blurring ratio of a recording sheet. However, the nozzle density of a head is not necessarily agreeable with such resolution. In other words, it may be possible to enhance resolution artificially by a method that uses a plurality of heads, a method that installs head(s) slantedly, a multiple scanning method wherein recording is made by scanning head(s) several times for the same line, or the like. Here, the blurring ratio of a paper sheet is a ratio between the sectional area and the diameter of an actual dot on the assumption that a discharged liquid droplet is spherical.

In this respect, for the present invention, even when an actual resolution is set at 1200 dpi because of recording an image only by one-color dots without superposing ink of different colors, the apparent resolution becomes 600 dpi or so if two colors of yellow, magenta and cyan are recorded in a specific region. Therefore, in order to obtain a high quality image in high resolution, it is preferable to make arrangement so that resolution should satisfy more than 1,000 dpi. Also, if the resolution is 1,000 dpi, for example, one inch square is divided into $10^6$ (=1,000×1,000), and if it is assumed to record in ink of four colors, the apparent resolution becomes $\sqrt{(10^6/4)}=500$ dpi. When this apparent resolution becomes 500 dpi or less, it is difficult to obtain color images in good quality. This is the reason why resolution should preferably be more than 1,000 dpi.

Also, for the present invention, it is preferable to record dots by means of bidirectional printing as shown in FIG. 6 or FIG. 7. This is because the present invention does not require ink of different colors to be superposed on the same landing point to form secondary color, and because no color tones become different due to the order in which dots are superposed even when bidirectional printing is performed. Further, with the performance of bidirectional printing, recording speed is increased to be able to enhance the resultant throughput.

Particularly among ink jet recording methods, the present invention demonstrates excellent results in a recording head or a recording apparatus, which adopts such recording method to create changes of state in ink by the application of thermal energy with the provision of means for generating thermal energy serving as energy to be utilized for discharging ink (such as electrothermal converting elements and laser beams). With such a method, it is possible to attain highly precise recording in high density.

As regards the typical structure and operational principle of such method, it is preferable to adopt those implemental by the application of the fundamental principle disclosed in the specifications of U.S. Pat. Nos. 4,723,129 and 4,740,796, for example. This method is applicable to the so-called on-demand type recording and a continuous type one as well. Here, in particular, it is suitable for the on-demand type because the principle is such that at least one driving signal, that corresponds to recording information and provides an abrupt temperature rise beyond nucleate boiling, is applied to each of the electrothermal transducing elements arranged correspondingly for a liquid (ink) retaining sheet or a liquid path to generate thermal energy, hence creating film boiling on the thermal activation surface of the recording head to effectively form resultant bubbles in liquid (ink) one to one corresponding to each of the driving signals. Then, by the development and contraction of each bubble, the liquid (ink) is discharged through each of the discharge openings, hence forming at least one droplet. The driving signal is more preferably in the form of pulses because the development and contraction of the bubble can be made instantaneously and appropriately to attain performing particularly excellent discharges of liquid (ink) in terms of the response action thereof. The driving signal in the form of pulses is preferably such as disclosed in the specifications of U.S. Pat. Nos. 4,463,359 and 4,345,262. In this respect, the temperature increasing rate of the thermoactive surface is preferably such as disclosed in the specification of U.S. Pat. No. 4,313,124 for an excellent recording in a better condition.

As the structure of the recording head, there are included in the present invention the structures such as disclosed in the specifications of U.S. Pat. Nos. 4,558,333 and 4,459,600 in which the thermal activation portions are arranged in a curved area, besides those which are shown in each of the above-mentioned specifications wherein the structure is arranged to combine the discharging openings, liquid paths, and the electrothermal transducing devices (linear type liquid paths or right-angled liquid paths). In addition, the present invention is effectively applicable to the structure disclosed in Japanese Patent Application Laid-Open No. 59-123670 wherein a common slit is used as the discharging openings for plural electrothermal transducing devices, and to the structure disclosed in Japanese Patent Application Laid-Open No. 59-138461 wherein an aperture for absorbing pressure waves of thermal energy is formed corresponding to the discharge openings. Recording is correctly and efficiently effected by the present invention even if any type of the recording head is employed.

Further, the present invention can be utilized effectively for the full-line type recording head, the length of which corresponds to the maximum width of a recording medium recordable by such recording apparatus. For the full-line type recording head, it may be possible to adopt either a structure that satisfies the required length by combining a plurality of recording heads or a structure arranged by one integrally formed recording head.

In addition, it may be possible to use a serial type of recording head as above-mentioned, a recording head fixed in a main body of an apparatus, an exchangeable chip type of recording head which makes electrical connection with or ink supply from the main body of an apparatus possible when it is installed on the main body of the apparatus, or a cartridge type head having an ink tank integrally formed with the recording head itself.

Also, for a structure of a recording apparatus according to the present invention, it is preferable to additionally provide a recording head with recovery means and preliminarily auxiliary means as constituents of the recording apparatus because these additional means contribute to making the effectiveness of the present invention more stabilized. To name them specifically, these are capping means, cleaning means, suction or compression means, pre-heating means such as electrothermal transducing devices or heating devices other than such transducing devices or the combination of those types of devices. Here, also, the performance of a pre-discharge mode whereby to make discharge other than the regular discharge is effective for the execution of stable recording.

The kind of mounted recording head and the number of mounted recording heads do not matter for the present invention. For example, the present invention is effectively applied to an apparatus having only one recording head for a single color or having plural recording heads for different record colors or different densities. That is, the present invention is extremely effective in applying it not only to a recording mode in which only a main color such as black is used, but also to an apparatus having at least one of multi-color modes with ink of different colors, or a full-color mode using the mixture of colors, irrespective of whether the recording heads are integrally structured or it is structured by a combination of plural recording heads.

Furthermore, as a mode of a recording apparatus provided with the recording mechanism that uses-the liquid jet recording head of the present invention, it may be possible to adopt the one serving as a copying apparatus combined with reader or the like, and also, the one serving as a facsimile equipment having functions to perform reception and transmission, besides such mode that serves as an image output terminal of a computer and other information processing equipment.

Figure 9:
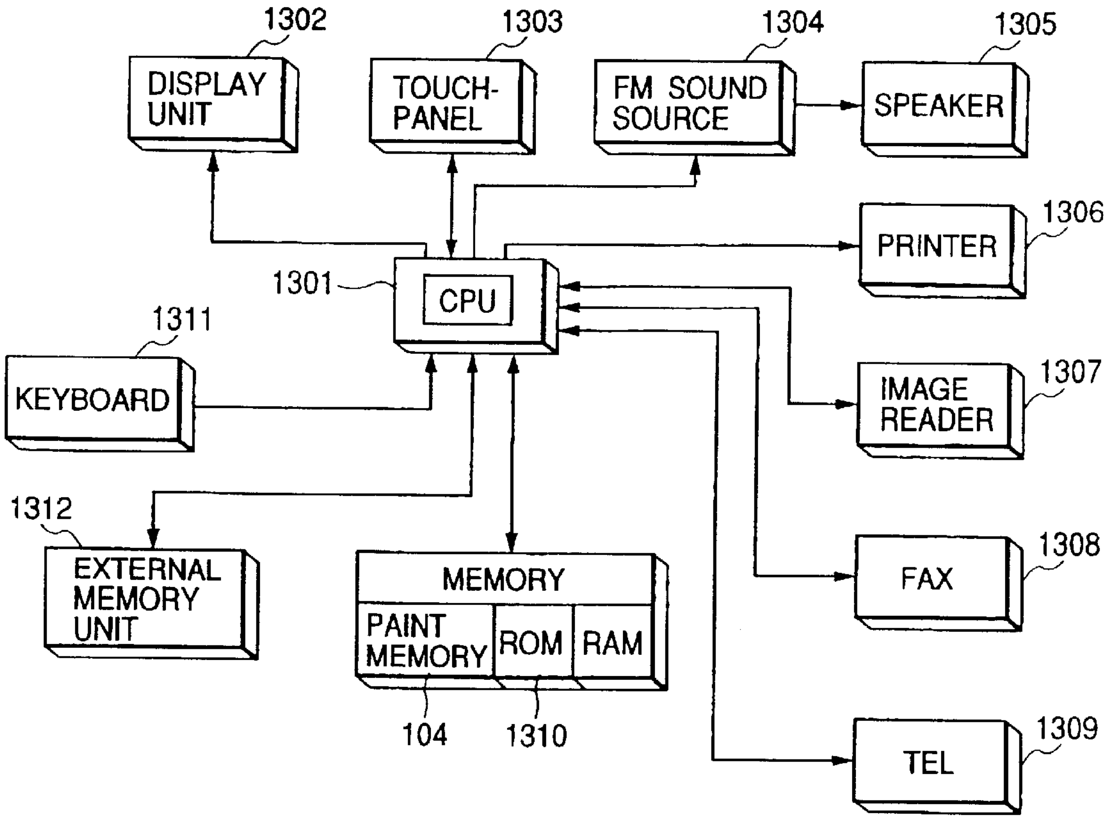
FIG. 9 is a block diagram which shows one example of information processing system using the recording apparatus to which the present invention is applicable.

FIG. 9 is a block diagram which schematically shows the structure of an information processing apparatus to which the recording apparatus of the present invention is applied. The information processing apparatus is provided with functions to serve as a word processor, a personal computer, a facsimile equipment, and a copying machine.

In FIG. 9, a reference numeral 1301 designates a controller that controls the apparatus as a whole, which is provided with a CPU such as a microprocessor, and various I/O ports to output control signals, data signals and the like to each unit, and to receive control signals and data signals from each unit for controlling; 1302, a display unit to display on a screen thereof various menus, document information, and image data or the like read out by an image reader 1307; and 1303, a pressure-sensitive transparent touch panel arranged on the display unit 1302, capable of inputting each item, coordinate positions or the like as indicated on the display unit 1302 when the surface thereof is depressed by use of a finger or the like as needed.

A reference numeral 1304 designates the FM (frequency modulation) sound source where music information produced by a music editor or the like is stored as digital data on a memory unit 1310 or an external memory unit 1312, and then, the FM modulation is performed by reading out such data from the memory unit. Electric signals from the FM sound source unit 1304 are transformed into audible sounds through a speaker unit 1305. A printer unit 1306, into which the recording apparatus of the present invention is incorporated, functions as an output terminal of the word processor, the personal computer, the facsimile equipment and the copying machine.

The image reader unit 1307 inputs data of an original document by reading it out photoelectrically, is positioned along a passage of the original document, and reads a facsimile original document, a copying original document, and various other kinds of original documents. Represented by 1308 is a transmission/reception unit of a facsimile section (FAX) provided with an external interface function, where the data of the original document thus read out by the image reading unit 1307 is transmitted as a facsimile signal or a received facsimile signal is decoded; and 1309 represents a telephone set provided with an ordinary telephoning function, an automatic answering function, and various other functions.

The storage unit 1310 contains a ROM that stores a system program, a manager program, and other application programs, as well as character fonts, a dictionary, and others, and memories that further include a video RAM and others to store application programs and document information loaded from the external memory device 1312.

A reference numeral 1311 designates a key board unit through which document information and various commands are inputted.

The external memory device 1312 uses a floppy disc or a hard disc as a storage medium, where document information, music or voice information, user's application programs, and others are stored.

Figure 10:
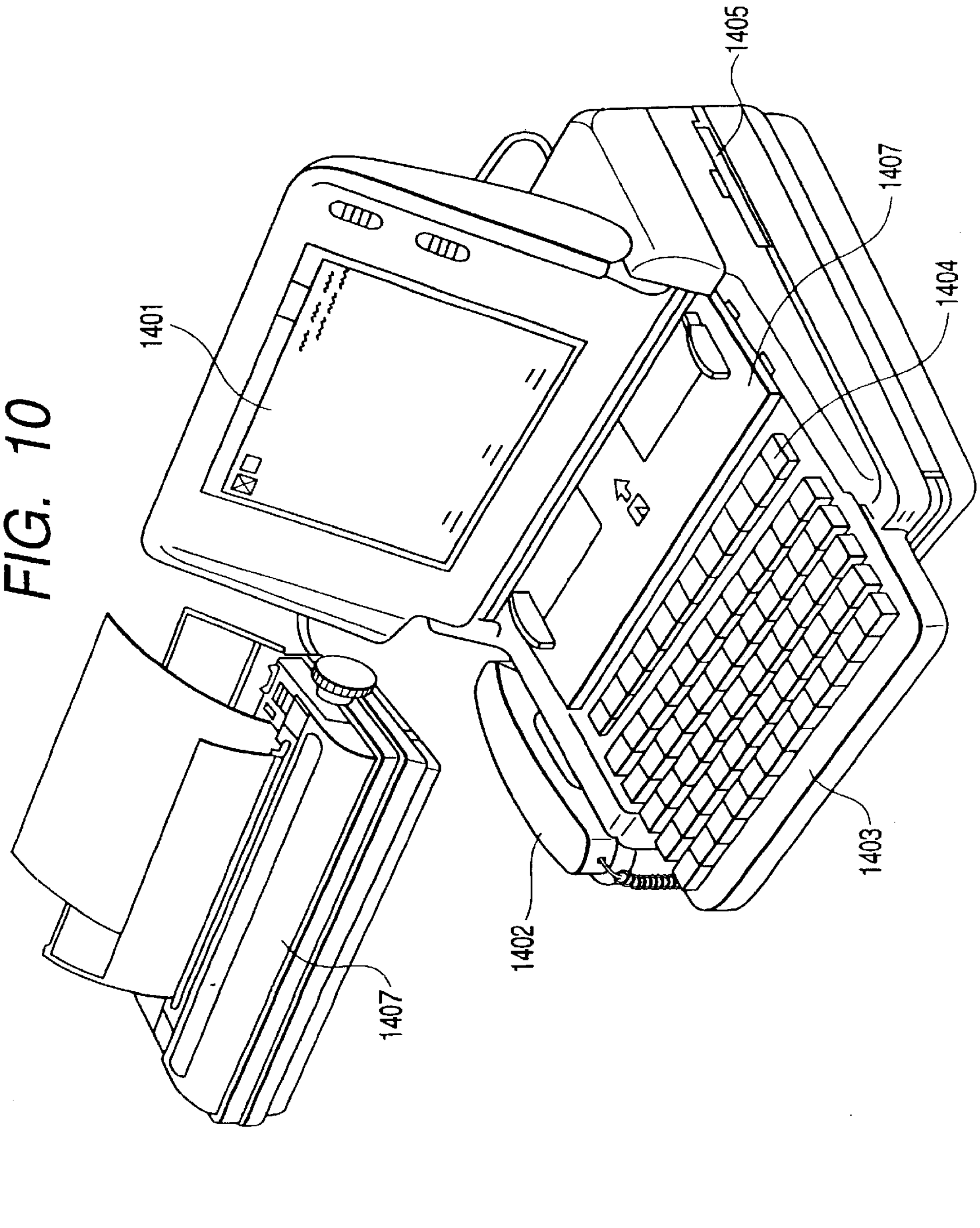
FIG. 10 is a perspective view Which shows the outer appearance of the aforesaid system.

FIG. 10 is a view which schematically shows the outer appearance of the information processing apparatus represented in FIG. 9.

In FIG. 10, a reference numeral 1401 designates a flat panel display to display various menus, graphic information, document information, and others. On the display 1401, the touch panel 1303 is provided for inputting coordinates and designated items by depressing the surface thereof; 1402 denotes a hand set to be used when the apparatus is used as a telephone set. A key board 1403 is connected detachably with a main body of the apparatus through a cord so as to input various document information and data. Also, various function keys 1404 and others are provided on the key board 1403. A reference numeral 1405 designates an insertion inlet of a floppy disk for use of the external memory device 1312.

A reference numeral 1406 designates a paper sheet stacking unit to put original documents thereon. After the original document has been read by the image reader unit 1307, it is ejected from the rear side of the apparatus. Also, for the facsimile reception or the like, recording is made by use of an ink jet printer 1407.

In this respect, the aforesaid display unit 1302 may be a CRT, but it is desirable to use a flat panel such as a liquid crystal display which utilizes ferro-electric liquid crystal, because a display of this type can make itself smaller, thinner, and lighter as well.

When the aforesaid information processing apparatus functions as a personal computer or a word processor, various kinds of information inputted through the key board unit 1311 are processed by the controller 1301 in accordance with a predetermined program, and output to the printer unit 1306 as images.

When the apparatus functions as the reception unit of the facsimile equipment, the controller 1301 receives and processes the facsimile information, which has been inputted from the FAX transmission and reception unit 1308 through communication line, in accordance with a predetermined program, and outputs the information thus processed to the printer unit 1306 as reception images.

Also, when the apparatus functions as the copying machine, the image reader unit 1307 reads out an original document, and the data on the original document thus read is output to the printer unit 1306 as copied images through the controller 1301. Here, when the apparatus functions as the reception unit of the facsimile equipment, the data on the original document read out by the image reader unit 1307 is processed by the controller 1301 for transmission in accordance with a predetermined program, and then, transmitted to a communication line through the FAX transmission and reception unit 1308.

Figure 11:
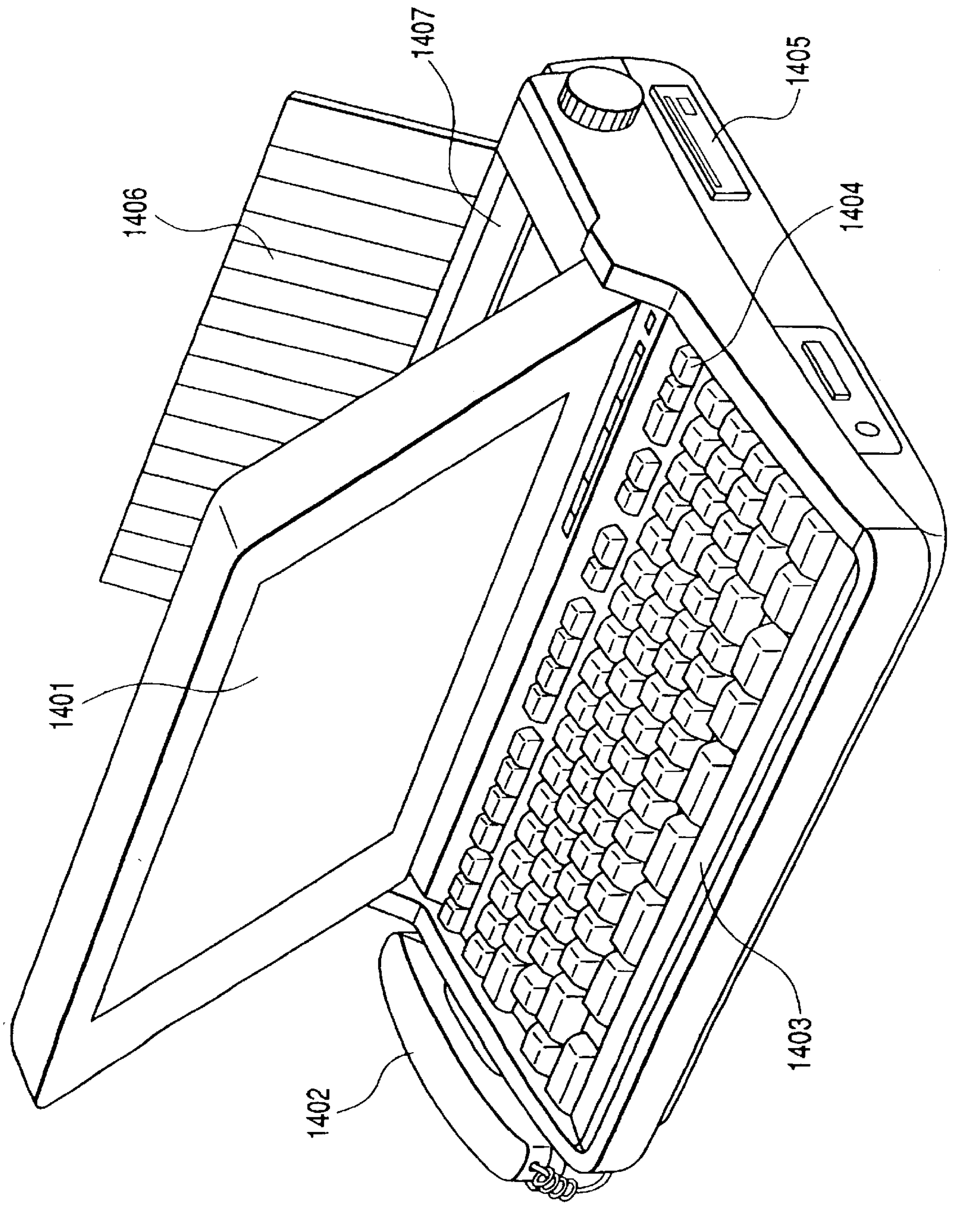
FIG. 11 is a view which shows the outer appearance of another example of the aforesaid system.

In this respect, as shown in FIG. 11, the information processing apparatus may be arranged to incorporate the ink jet printer in it as an integrated type. In this case, it becomes possible to enhance its portability more. In FIG. 11, corresponding reference numerals are applied to the parts having the same functions as those shown in FIG. 10.

With the application of the recording apparatus of the present invention to the aforesaid multi-functional type information processing apparatus, it becomes possible to obtain high quality images recorded at high speed with a lesser amount of noises. The functions of the information processing apparatus can be enhanced further still.

EMBODIMENTS

Now, the description will be made of the typical examples of numerical ranges referred to in the claims of the present invention in accordance with the embodiments given below. Here, it is needless to mention that recording has been made in good quality each at the upper limit and the lower limit of such numerical ranges.

EMBODIMENTS 1

Using pigment ink (No. 1) given below, recording is made in a region of red color.
(The Composition of No. 1 Pigment Magenta Ink)

| | |
|---|---|
| C. I. Pigment Red 122 | 3.0 wt % |
| resin | 0.8 wt % |
| monoethanol amine | 0.3 wt % |
| glycerin | 15.0 wt % |
| ethylene glycol | 15.0 wt % |
| ethanol | 3.0 wt % |
| ion-exchange water | 62.9 wt % |

(The Composition of No. 1 Pigment Yellow Ink)

| | |
|---|---|
| C. I. Pigment Yellow 13 | 3.0 wt % |
| resin | 0.8 wt % |
| monoethanol amine | 0.3 wt % |
| glycerin | 15.0 wt % |
| ethylene glycol | 15.0 wt % |
| ethanol | 3.0 wt % |
| ion-exchange water | 62.9 wt % |

For the aforesaid resin, the weight ratio of styrene, acrylic acid, and acrylate is styrene acrylic acid:acrylate=59:28.5:12.5, which are used with oxidation 174 and molecular weight of 18,000. Also, the ink property thereof is: magenta—viscosity 2.8 cps and surface tension 45 dyne/cm; yellow—viscosity 2.9 cps and surface tension 44 dyne/cm.

Using the magenta and yellow inks as described above, a printing test is carried out in such a manner as given below. At first, the weight ratio of silica and styrene acrylic polymer is prepared to be silica:styrene acrylic acid polymer=8:2, which is coated on a non-coat paper in an amount of 3 g/m$^2$ so that the blurring ratio becomes 2 for this paper, and is defined as a coated paper A.

Then, as shown in FIG. 7, a zigzag pattern is printed on the coated paper A with the ink discharge amount of 2 pl and resolution of 1,200 dpi. The OD values of magenta ink dots and yellow ink dots on the coated paper A are measured. The OD value of magenta ink dots is 1.1, and that of yellow ink dots is 1.0. As a printed object, it has a sufficient density.

Also, each dot diameter is $\phi$=25 $\mu$m. The color difference of the printed object is also measured with the good result of L*a*b* color indication: a*=36 and b*=27, and saturation: C*=45. Further, with the smaller degree of superposition of dots, curling, cockling, and blurring do not occur, and fixing capability is excellent.

COMPARATIVE EXAMPLE 1

The density of ink pigment used for the embodiment 1 is made 1/2 to prepare ink (No. 2) as given below, and then, recording is made in a region of red color in the same manner as the embodiment 1.
(The Composition of No. 2 Pigment Magenta Ink)

| | |
|---|---|
| C. I. Pigment Red 122 | 1.5 wt % |
| resin | 0.8 wt % |
| monoethanol amine | 0.3 wt % |
| glycerin | 15.0 wt % |
| ethylene glycol | 15.0 wt % |
| ethanol | 3.0 wt % |
| ion-exchange water | 64.4 wt % |

(The Composition of No. 2 Pigment Yellow Ink)

| | |
|---|---|
| C. I. Pigment Yellow 13 | 1.5 wt % |
| resin | 0.8 wt % |
| monoethanol amine | 0.3 wt % |
| glycerin | 15.0 wt % |
| ethylene glycol | 15.0 wt % |
| ethanol | 3.0 wt % |
| ion-exchange water | 64.4 wt % |

The ink property thereof is: magenta—viscosity 2.5 cps and surface tension 47 dyne/cm; yellow—viscosity 2.8 cps and surface tension 45 dyne/cm.

Figure 8:
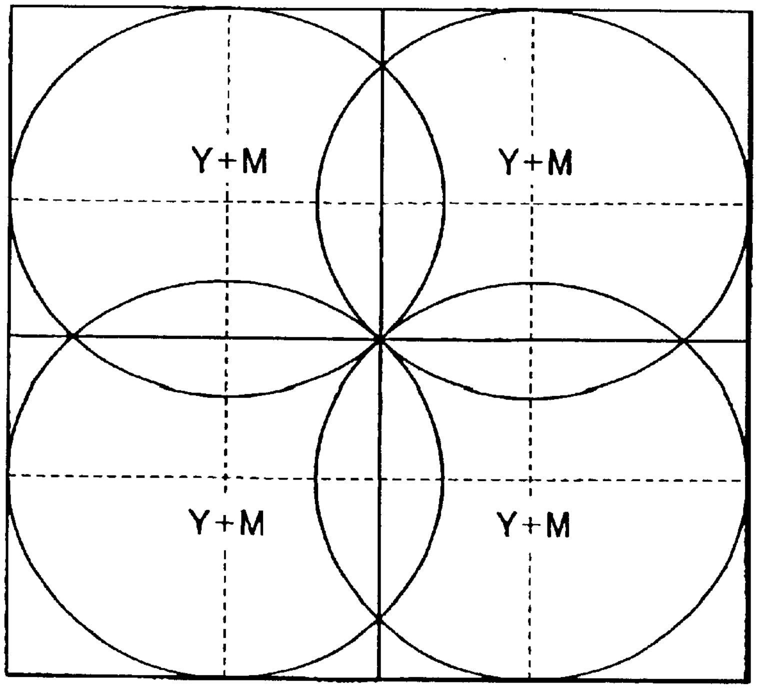
FIG. 8 is a view which shows ink of different colors superposed on the same landing point.

Using the magenta and yellow inks as described above, a printing test is carried out in such a manner as given below. At first, a coated paper A is prepared. Then, as shown in FIG. 8, a pattern, on which magenta ink and yellow ink are superposed on the same landing point, is printed on the coated paper A with the ink discharge amount of 14 pl and resolution of 600 dpi. The OD values of magenta ink dots and yellow ink dots on the coated paper A are measured. The OD value of magenta ink dots is 0.8, and that of yellow ink dots is 0.6.

Also, each dot diameter is $\phi$=60 $\mu$m. The color difference of the printed object is also measured with the result of L*a*b* color indication: a*=29 and b*=22, and saturation: C*=36.

For the comparative example 1, the amount of colorant on the paper is almost the same as that of the embodiment 1, but with the superposition of dots, saturation is extremely reduced as compared with that of the embodiment 1. Also, the range of color reproduction becomes narrower. Also, with the increased amount of solvent on the paper due to the superposed dots, curling, cockling, and blurring occur to make the fixing capability inferior to the embodiment 1.

EMBODIMENT 2

Using pigment ink (No. 3) given below, which is prepared by adding binder to the pigment ink of the embodiment 1, recording is made in a region of red color.

(The Composition of No. 3 Pigment Magenta Ink)

| | |
|---|---|
| C. I. Pigment Red 122 | 3.0 wt % |
| resin | 0.8 wt % |
| monoethanol amine | 0.3 wt % |
| glycerin | 15.0 wt % |
| ethylene glycol | 15.0 wt % |
| ethanol | 3.0 wt % |
| ion-exchange water | 54.9 wt % |
| binder | 8.0 wt % |

(The Composition of No 3 Pigment Yellow Ink)

| | |
|---|---|
| C. I. Pigment Yellow 13 | 3.0 wt % |
| resin | 0.8 wt % |
| monoethanol amine | 0.3 wt % |
| glycerin | 15.0 wt % |
| ethylene glycol | 15.0 wt % |
| ethanol | 3.0 wt % |
| ion-exchange water | 54.9 wt % |
| binder | 8.0 wt % |

For the present embodiment, water soluble acrylic acid resin is used as binder. Besides this resin, however, water soluble resin of water soluble cellulose, water soluble polyester, water soluble polyamide, water soluble polyurethane, or the like may be usable or the emulsion whose granular diameter is 0.2 μm or less or the like may be usable. Also, the binder is not necessarily limited to the one mentioned here. Any material that may demonstrate effect as a binder is usable. Also, the ink property thereof is: magenta—viscosity 3.0 cps and surface tension 44 dyne/cm; yellow—viscosity 3.2 cps and surface tension 45 dyne/cm.

Using the magenta and yellow inks as described above, a printing test is carried out in such a manner as given below. At first, a coated paper A is prepared.

Then, as shown in FIG. 7, a zigzag pattern is printed on the coated pater A with the ink discharge amount of 2 pl and resolution of 1,200 dpi. The OD values of magenta ink dots and yellow ink dots on the coated paper A are measured. The OD value of magenta ink dots is 1.2, and that of yellow ink dots is 1.1. As a printed object, it has a sufficient density.

Also, each dot diameter is ϕ=28 μm. The color difference of the printed object is also measured with the good result of L*a*b* color indication: a*=38 and b*=29, and saturation: C*=48. Further, with the smaller degree of superposition of dots, curling, cockling, and blurring do not occur, and fixing capability is excellent. Also, resistance to abrasion is enhanced.

EMBODIMENT 3

Using dyestuff ink (No. 4) given below, recording is made in a region of red color.

(The Composition of No. 4 Dyestuff Magenta Ink)

| | |
|---|---|
| C. I. Acid Red 92 | 2.0 wt % |
| glycerin | 15.0 wt % |
| thiodiglycol | 15.0 wt % |
| ethanol | 5.0 wt % |
| urea | 5.0 wt % |
| ion-exchange water | 58.0 wt % |

(The Composition of No. 4 Dyestuff Yellow Ink)

| | |
|---|---|
| C. I. Acid Yellow 23 | 2.0 wt % |
| glycerin | 15.0 wt % |
| thiodiglycol | 15.0 wt % |
| ethanol | 5.0 wt % |
| urea | 5.0 wt % |
| ion-exchange water | 58.0 wt % |

The ink property thereof is: magenta—viscosity 2.9 cps and surface tension 45 dyne/cm; yellow—viscosity 2.8 cps and surface tension 44 dyne/cm.

Using the magenta and yellow inks as described above, a printing test is carried out in such a manner as given below. At first, a coated paper A is prepared.

Then, as shown in FIG. 7, a zigzag pattern is printed on the coated paper A with the ink discharge amount of 2 pl and resolution of 1,200 dpi. The OD values of magenta ink dots and yellow ink dots on the coated paper A are measured. The OD value of magenta ink dots is 1.1, and that of yellow ink dots is 1.0. As a printed object, it has a sufficient density.

Also, each dot diameter is ϕ=26 μm. The color difference of the printed object is also measured with the good result of L*a*b* color indication: a*=44 and b*=21, and saturation: C*=49. Further, with the smaller degree of superposition of dots, curling, cockling, and blurring do not occur, and fixing capability is excellent. Also, for the present embodiment, the zigzag pattern is printed by use of bidirectional printing. However, with the smaller degree of dot superposition, no difference occurs in the color tones even by use of the bidirectional printing. Higher speed printing is made possible.

COMPARATIVE EXAMPLE 2

The density of ink pigment used for the embodiment 3 is made 1/2 to prepare ink (No. 5) as given below, and then, recording is made in a region of red color in the same manner as the embodiment 3.

(The Composition of No. 5 Dyestuff Magenta Ink)

| | |
|---|---|
| C. I. Acid Red 92 | 1.0 wt % |
| glycerin | 15.0 wt % |
| thiodiglycol | 15.0 wt % |
| ethanol | 5.0 wt % |
| urea | 5.0 wt % |
| ion-exchange water | 59.0 wt % |

(The Composition of No. 5 Dyestuff Yellow Ink)

| | |
|---|---|
| C. I. Acid Yellow 23 | 1.0 wt % |
| glycerin | 15.0 wt % |
| thiodiglycol | 15.0 wt % |
| ethanol | 5.0 wt % |
| urea | 5.0 wt % |
| ion-exchange water | 59.0 wt % |

The ink property thereof Is: magenta—viscosity 2.8 cps and surface tension 45 dyne/cm; yellow—viscosity 2.7 cps and surface tension 44 dyne/cm.

Using the magenta and yellow inks as described above, a printing test is carried out in such a manner as given below. At first, a coated paper A is prepared. Then, as shown in FIG. 8, a pattern, on which magenta ink and yellow ink are superposed on the same landing point, is printed on the coated paper A with the ink discharge amount of 14 pl and resolution of 600 dpi. The OD values of magenta ink dots and yellow ink dots on the coated paper A are measured. The OD value of magenta ink dots is 0.7, and that of yellow ink dots is 0.7.

and b*=20, and saturation: C*=47. For the comparative example 3, there is no dot superposition at all, and the printing density is low as a whole. The resultant quality of prints is made lower.

The Table 1 indicates the respective conditions and results of the embodiments 1, 2, and 3, and the comparative examples 1, 2, and 3.

TABLE 1

| Properties | | | Viscosity (cps) | Surface Tension (dyn/cm) | Dot Density | Discharge Amount (ng) | Dot Diameter ($\mu$m) | Color Difference a* | b* | C* | |
|---|---|---|---|---|---|---|---|---|---|---|---|
| Embodiment 1 | Pigment ink | magenta | 2.8 | 45 | 1.1 | 2.0 | 30 | 36 | 27 | 45 | |
| | 1200 dpi | yellow | 2.9 | 44 | 1.0 | | | | | | |
| Comparative | Pigment ink (density 1/2) | magenta | 2.5 | 47 | 0.8 | 14.0 | 60 | 29 | 22 | 36 | |
| Example 1 | 600 dpi | yellow | 2.8 | 45 | 0.6 | | | | | | |
| Embodiment 2 | Pigment ink (containing | magenta | 3.0 | 44 | 1.2 | 2.0 | 28 | 38 | 29 | 48 | |
| | binder) 1200 dpi | yellow | 3.2 | 45 | 1.1 | | | | | | |
| Embodiment 3 | Dyestuff ink | magenta | 2.9 | 45 | 1.1 | 2.0 | 32 | 44 | 21 | 49 | |
| | 1200 dpi | yellow | 2.8 | 44 | 1.0 | | | | | | |
| Comparative | Dyestuff ink (density 1/2) | magenta | 2.8 | 45 | 0.7 | 14.0 | 60 | 40 | 20 | 45 | M shot earlier |
| Example 2 | 600 dpi | yellow | 2.7 | 44 | 0.7 | | | 42 | 17 | 45 | Y shot earlier |
| Comparative | Dyestuff ink | magenta | 2.9 | 45 | 1.1 | 1.0 | 23 | 43 | 20 | 47 | |
| Example 3 | 1000 dpi | yellow | 2.8 | 44 | 1.0 | | | | | | |

Also, each dot diameter is $\phi$=60 $\mu$m. The color difference of the printed object is also measured. When magenta is printed earlier, there is a tendency that yellow becomes stronger, with the result of L*a*b* color indication: a*=40 and b*=20, and saturation: C*=45. Also, when yellow is printed earlier, there is a tendency that magenta becomes stronger, with the result of L*a*b* color indication: a*=42 and b*=17, and saturation: C*=45.

For the comparative example 2, the amount of colorant on the paper is almost the same as that of the embodiment 3, but with the larger degree of dot superposition, saturation is extremely reduced as compared with that of the embodiment 3. Also, the range of color reproduction becomes narrower. Also, with the increased amount of solvent on the paper due to the superposed dots, curling, cockling, and blurring occur to make the fixing capability inferior to the embodiment 3. Further, since color tones become different depending on the order of ink superpositions, this ink is not suitable for the performance of bidirectional printing and it is difficult to perform printing at higher speed.

COMPARATIVE EXAMPLE 3

Printing is performed using the same ink as the embodiment 3.

The ink property thereof is the same as the embodiment 3 with magenta—viscosity 2.8 cps and surface tension 45 dyne/cm; yellow—viscosity 2.7 cps and surface tension 44 dyne/cm.

Using the magenta and yellow inks as described above, printing is performed by use of a printer having the discharging amount of 1 ng, and resolution of 1,000 dpi on the coated paper A. The dot density is the same as the embodiment 3, that, is magenta 1.1, and yellow 1.0.

Then, as in the embodiment 1, a zigzag pattern is test printed (see the discharge pattern shown in FIG. 6). In this case, the dot diameter is $\phi$=23 $\mu$m. The color difference of the printed object is also measured with the result: a*=43

As described above, in accordance with the present invention, ink of different colors is not essentially superposed, and images are formed only with monochromic dots. As a result, it becomes possible to obtain images in high saturation.

Also, with the smaller dot superposition, the amount of solvent becomes smaller on a recording paper sheet, and the occurrence of curling and cockling is also smaller accordingly. Therefore, blurring can be reduced to enhance the fixing capability. Also, no difference takes place in color tones irrespective of the order of ink superposition, hence making it possible to perform bidirectional printing at high speed.

What is claimed is:

1. A color ink jet recording method for forming a color image on a recording medium by discharging ink of plural colors from an ink jet head in accordance with image data to enable monochrome dot(s) to form one pixel, comprising the step of:

performing a recording operation by forming on the recording medium ink dots of plural colors having an optical density of at least 1 but no more than 1.5 with an average dot diameter $\phi$ ($\mu$m) after fixation of ink applied thereon being $(2.54\times10^4/R)\leqq\phi\leqq(\sqrt{2}\times2.54\times10^4/R)$ (where R is a resolution in units of dpi (dot/inch)), wherein the relation between the dot diameter $\phi$ and a distance 1 between centers of adjacent dots satisfies a range of $\sqrt{2}\times\phi/2\leqq 1\leqq\phi$.

2. A color ink jet recording method according to claim 1, wherein the resolution of the color image formed on the recording medium is 1,000 dpi or more.

3. A color ink jet recording method according to claim 1, wherein the ink of plural colors includes at least the colors of yellow, cyan, and magenta.

4. A color ink jet recording method according to claim 1, wherein the ink has a viscosity $\eta$ (cps) of $1\leqq\eta\leqq10$, and a surface tension $\gamma$ (dyne/cm) of $35\leqq\gamma\leqq70$.

5. A color ink jet recording method according to claim 1, wherein the ink comprises 1 to 10 wt% of pigment based on the entire weight of the ink.

6. A color ink jet recording method according to claim 5, wherein the ink further comprises at least resin, and the ratio of the pigment and the resin is within a range of (100:1) to (100:300).

7. A color ink jet recording method according to claim 1, wherein the ink comprises 1 to 10 wt% of dyestuff based on the entire weight of the ink.

8. A color ink jet recording method according to claim 7, wherein the ink further comprises at least resin, and the ratio of the dyestuff and the resin is within a range of (100:1) to (100:300).

9. A color ink jet recording method according to claim 1, wherein the ink jet head comprises thermal energy generating elements for generating thermal energy to discharge the ink.

10. A color ink jet recording apparatus for forming a color image on a recording medium in accordance with image data by discharging ink to a recording medium to enable monochrome dot(s) to form one pixel by scanning an ink jet head, having a plurality of discharge ports for discharging ink of plural colors, relatively to the recording medium, comprising:

driving means for causing the ink jet head to record in accordance with the image data so as to enable ink dots of plural colors having an optical density of at least 1 but no more than 1.5 be within a range of an average dot diameter $\phi$ ($\mu$m) after fixation of ink applied thereon being $(2.54\times10^4/R)\leqq\phi\leqq(\sqrt{2}\times2.54\times10^4/R)$ (where R is a resolution in units of dpi (dot/inch)), wherein the relation between the dot diameter $\phi$ and a distance 1 between centers of adjacent dots satisfies a range of $\sqrt{2}\times\phi/2\leqq l\leqq\phi$.

11. A color ink jet recording apparatus according to claim 10, wherein the resolution of the color image formed on the recording medium is 1,000 dpi or more.

12. A color ink jet recording apparatus according to claim 10, wherein said ink jet head comprises thermal energy generating elements for generating thermal energy for discharging the ink.

13. A method for processing image data to form a color image on a recording medium by discharging ink of plural colors from an ink jet head in accordance with the image data, comprising the steps of:

providing image data of an image to be formed; and processing the image data for forming the image on the recording medium, by enabling monochrome dot(s) to form one pixel, ink dots of plural colors having an optical density of at least 1 but no more than 1.5 with an average dot diameter $\phi$ ($\mu$m) after fixation of ink applied thereon being $(2.54\times10^4/R)\leqq\phi\leqq(\sqrt{2}\times2.54\times10^4/R)$ (where R is a resolution in units of dpi (dot/inch)), wherein the relation between the dot diameter $\phi$ and a distance 1 between centers of adjacent dots satisfies a range of $\sqrt{2}\times\phi/2\leqq l\leqq\phi$.

14. An apparatus for processing image data to form a color image on a recording medium by discharging ink of plural colors from an ink jet head in accordance with the image data, comprising:

means for processing the image data to form the image on the recording medium, by enabling monochrome dot(s) to form one pixel, ink dots of plural colors having an optical density of at least 1 but no more than 1.5 with an average dot diameter $\phi$ ($\mu$m) after fixation of ink applied thereon being $(2.54\times10^4/R)\leqq\phi\leqq(\sqrt{2}\times2.54\times10^4/R)$ (where R is a resolution in units of dpi (dot/inch)), wherein the relation between the dot diameter $\phi$ and a distance 1 between centers of adjacent dots satisfies a range of $\sqrt{2}\times\phi/2\leqq l\leqq\phi$.

* * * * *

UNITED STATES PATENT AND TRADEMARK OFFICE

CERTIFICATE OF CORRECTION

PATENT NO. : 6,435,655 B1

DATED : August 20, 2002

INVENTOR(S) : Yoshihara et al.

It is certified that error appears in the above-identified patent and that said Letters Patent is hereby corrected as shown below:

Column 1,
Line 38, "ink," should read -- inks, --; and
Line 62, "in" should read -- of --.

Column 2,
Line16, "becomes" should be deleted;
Line17, "recorded." should read -- recorded becomes. --, and "in" should read -- of --;
Line 19, "Is" should read -- is --; and
Line 29, "good" should read -- well --.

Column 4,
Line 1, "ink" should read -- inks --;
Line 6, "Which" should read -- which --;
Line 19, "in" should be deleted;
Line 33, "Jet" should read -- jet --; and
Line 63, "direction x" should read -- direction X --.

Column 7,
Line 1, "ink of different colors is" should read -- inks of different colors are --;
Line 17, "not" should read -- is not --; and
Line 35, "are caused to" should be deleted.

Column 8,
Line 33, "is" should read -- is chosen --;
Line 34, "implements" should read -- strives --; and
Line 58, "stable," should read -- stably, --.

Column 9,
Line 4, "the ink composition does not matter whether it" should read -- it does not matter whether the ink composition --;
Line 15, "is easier" should be deleted; and
Line 16, "to occur," should read -- occurs more easily, --.

Column 10,
Line 2, "implemental" should read -- implemented --.

Column 11,
Line 26, "uses-the" should read -- uses the --.

UNITED STATES PATENT AND TRADEMARK OFFICE
CERTIFICATE OF CORRECTION

PATENT NO. : 6,435,655 B1
DATED : August 20, 2002
INVENTOR(S) : Yoshihara et al.

It is certified that error appears in the above-identified patent and that said Letters Patent is hereby corrected as shown below:

Column 13,
Line 31, "EMBODIMENTS 1" should read -- EMBODIMENT 1 --; and
Line 58, "styrene" should read -- styrene: --.

Column 14,
Line 20, "as" should read -- as in --.

Column 16,
Line 44, "as" should read -- as in --; and
Line 65, "Is:" should read -- is: --.

Column 17,
Line 52, "as" should read -- as in --; and
Line 54, "as" should read -- as in --.

Column 18,
Line 30, "ink of different colors is" should read -- inks of different colors are --.

Signed and Sealed this

Eighteenth Day of February, 2003

JAMES E. ROGAN
*Director of the United States Patent and Trademark Office*